(12) United States Patent
Uenishi et al.

(10) Patent No.: US 6,881,384 B1
(45) Date of Patent: Apr. 19, 2005

(54) CATALYTIC CONVERTER FOR CLEANING EXHAUST GAS

(75) Inventors: Mari Uenishi, Osaka (JP); Isao Tan, Osaka (JP); Hirohisa Tanaka, Osaka (JP)

(73) Assignee: Daihatsu Motor Co., Ltd., Osaka (JP)

( * ) Notice: Subject to any disclaimer, the term of this patent is extended or adjusted under 35 U.S.C. 154(b) by 860 days.

(21) Appl. No.: 09/649,070

(22) Filed: Aug. 29, 2000

(30) Foreign Application Priority Data

Aug. 30, 1999 (JP) ............................................ 11-242879
Sep. 3, 1999 (JP) ............................................ 11-250268

(51) Int. Cl.⁷ .......................... B01J 23/10; B01J 23/40; B01J 21/04; B01J 21/06
(52) U.S. Cl. ...................... 422/177; 422/180; 502/304; 502/328
(58) Field of Search ................................ 422/171, 177, 422/180; 502/439, 340, 217, 222, 223, 303, 304, 325, 328, 333, 339, 341, 349, 350

(56) References Cited

U.S. PATENT DOCUMENTS

| | | | |
|---|---|---|---|
| 4,927,799 A | 5/1990 | Matsumoto et al. | ........ 502/303 |
| 5,075,276 A | 12/1991 | Ozawa et al. | ................ 502/304 |
| 5,147,842 A * | 9/1992 | Funabiki et al. | ............. 502/304 |
| 5,712,218 A | 1/1998 | Chopin et al. | ................ 502/304 |
| 6,261,989 B1 * | 7/2001 | Tanaka et al. | ............... 502/217 |

FOREIGN PATENT DOCUMENTS

| | | | | |
|---|---|---|---|---|
| DE | 39 13972 | | 11/1989 | ............. B01J/23/10 |
| DE | 100 24 994 | | 1/2001 | ............ B01D/53/88 |
| WO | WO99/19060 | | 4/1999 | ............ B01J/23/54 |

* cited by examiner

Primary Examiner—Hien Tran
(74) Attorney, Agent, or Firm—Michael Bednarek; Shaw Pittman LLP

(57) ABSTRACT

A catalytic converter for cleaning exhaust gas includes a heat-resistant support, and a catalytic coating formed on the heat-resistant support. The catalytic coating contains zirconium complex oxide on which Pt and Rh are coexistently carried, and cerium complex oxide on which Pt and Rh are coexistently carried. The Pt- and Rh-carrying zirconium complex oxide and the Pt- and Rh-carrying cerium complex oxide are contained in a same layer of the catalytic coating.

6 Claims, 3 Drawing Sheets

CATALYTIC CONVERTER FOR CLEANING EXHAUST GAS

BACKGROUND OF THE INVENTION

1. Field of the Invention

The present invention relates to a catalytic converter for effectively cleaning the exhaust gas of an automotive internal combustion engine by removal of nitrogen oxide ($NO_x$), carbon monoxide (CO) and hydrocarbons (HC).

2. Description of the Related Art

As is well known, the exhaust gas of an automotive internal combustion engine inevitably contains harmful substances such as $NO_x$, CO and HC. In recent years, particularly, the restrictions on exhaust gas cleaning are increasingly strict for environmental protection.

A so-called three-way catalytic converter has been most widely used for removing the above-described harmful substances. The three-way catalytic converter utilizes, as an active substance, a precious metal or metals such as Pt, Pd and/or Rh for reducing $NO_x$ to $N_2$ and for oxidizing CO and HC to $CO_2$ and $H_2O$. In this way, the three-way catalytic converter works as a catalyst both for oxidation and reduction.

Various researches have been made to improve the performance of a three-way catalytic converter. One of the three-way catalytic converters which have resulted from such researches utilizes cerium oxide ($CeO_2$) which has an oxygen-storing capacity (OSC); that is, the capacity to occlude gaseous oxygen in the crystalline structure and to release the occluded oxygen from the crystalline structure. More specifically, $CeO_2$ is added to a three-way catalytic converter for adjusting the oxygen concentration of gaseous atmosphere, so that excess oxygen in the gaseous atmosphere is occluded into the crystalline structure of $CeO_2$ in an oxygen-rich state for assisting the catalytic converter in reducing $NO_x$ to $N_2$ while releasing the occluded oxygen into the gaseous atmosphere in a CO— and/or HC-rich state for assisting the catalytic converter in oxidizing CO and HC to $CO_2$ and $H_2O$, respectively.

Meanwhile, there is an increasing demand for shifting the mounting location of the catalytic converter from below the body floor to the exhaust manifold which is near the engine, whereby the catalyst can be quickly warmed up after starting the engine. Due to such a location, however, the catalytic converter may be often exposed to high temperature of no less than 900° C. (or sometimes even higher than 1,000° C.). Thus, the catalytic converter needs to provide a high catalytic activity even at such a high temperature. Further, the catalytic converter is also required to provide a high catalytic activity at relatively low temperature before the engine is sufficiently warmed up upon start thereof.

DISCLOSURE OF THE INVENTION

It is, therefore, an object of the present invention to provide a catalytic converter for cleaning exhaust gas which is capable of maintaining a high catalytic activity even at high temperature while also providing an effective catalytic activity at relatively low temperature before the engine is sufficiently warmed up.

According to the present invention, a catalytic converter for cleaning exhaust gas comprising: a heat-resistant support; and a catalytic coating formed on the heat-resistant support; wherein the catalytic coating contains particles of zirconium complex oxide on which Pt and Rh are coexistently carried, and particles of a cerium complex oxide on which Pt and Rh are coexistently carried; wherein the zirconium complex oxide is represented by the following general formula:

$$Zr_{1-(a+b)}Ce_aN_bO_{2-c} \qquad (1)$$

in the formula (1), N represents an element selected from the group consisting of an alkaline earth metal and a rare earth element other than Ce and Zr, c represents the degree of oxygen deficiency determined by the valence and proportion of the contained element N, $0.65 \leq 1-(a+b) \leq 0.9$, $0.10 \leq a \leq 0.35$, and $0 \leq b \leq 0.2$; wherein the cerium complex oxide is represented by the following general formula:

$$Ce_{1-(x+y)}Zr_xM_yO_{2-z} \qquad (2)$$

in the formula (2), M represents an element selected from the group consisting of an alkaline earth metal and a rare earth element other than Ce and Zr, z represents the degree of oxygen deficiency determined by the valence and proportion of the contained element M, $0.35 \leq 1-(x+y) \leq 0.80$, $0.20 \leq x \leq 0.65$, and $0 \leq y \leq 0.2$; and wherein the Pt- and Rh-carrying zirconium complex oxide and the Pt- and Rh-carrying cerium complex oxide are contained in a same layer of the catalytic coating.

As appreciated from the above formula (1), the zirconium complex oxide may be a complex of zirconium dioxide (zirconia) with cerium dioxide (ceria). Basically, zirconium dioxide has good heat resistance, but its heat resistance may be enhanced by the addition of cerium because cerium restrains grain growth of zirconium dioxide due to mass transfer. Thus, it is possible to prevent or restrain Pt and Rh carried on the zirconium complex oxide from being sintered with the particles of the zirconium complex oxide, which may cause deactivation of these precious metals. For this reason, the proportion of Zr in the zirconium complex oxide is selected to satisfy $0.65 \leq 1-(a+b) \leq 0.9$, whereas the proportion of Ce in the zirconium complex oxide is selected to satisfy $0.10 \leq a \leq 0.35$. It should be understood that the content of Zr in the zirconium complex oxide may include 1~3% of hafnium (Hf) which is inevitably contained in Zr ores.

The zirconium complex oxide may additionally contain a small amount of an alkaline earth metal and/or a rare earth element other than Ce and Zr. Each of these elements stabilizes the crystalline structure of the zirconium complex oxide, thereby additionally enhancing the heat resistance of the complex oxide. In consideration of the respective contents of Zr and Ce, the proportion of the additional element may be selected to satisfy $0 \leq b \leq 0.2$.

As appreciated from the above formula (2), the cerium complex oxide may be a complex of cerium dioxide (ceria) with zirconium dioxide (zirconia). The cerium complex oxide is contained in the catalytic coating for utilizing the oxygen storing capacity (OSC) of cerium dioxide to assist Pt and Rh in reducing $NO_x$ and oxidizing CO and HC by adjusting the oxygen concentration of the exhaust gas. Further, in an oxidizing atmosphere (i.e., $O_2$-rich state), since the cerium complex oxide occludes oxygen from the $O_2$-rich exhaust gas, it is possible to prevent or restrain grain growth of Pt which may result from oxidation of Pt, thereby restraining deterioration of catalytic activity of Pt (or catalytic converter as a whole). In view of this, the content of Ce in the cerium complex oxide is selected to satisfy $0.35 \leq 1-(x+y) \leq 0.80$.

On the other hand, the inclusion of Zr (namely, zirconium dioxide) in the cerium complex oxide is for enhancing the heat resistance of the cerium complex oxide by restraining grain growth of cerium dioxide. In view of this, the content of Zr in the cerium complex oxide is selected to satisfy $0.20 \leq x \leq 0.65$.

The cerium complex oxide may additionally contain a small amount of an alkaline earth metal and/or a rare earth element other than Ce and Zr. Each of these elements stabilizes the crystalline structure of the zirconium complex oxide, thereby additionally enhancing the heat resistance of the complex oxide. In consideration of the respective contents of Ce and Zr, the proportion of the additional element may be selected to satisfy $0 \leq y \leq 0.2$.

Examples of rare earth elements (not including Zr and Ce) to be contained in the the zirconium complex oxide and/or the cerium complex oxide include Sc, Y, La, Pr, Nd, Pm, Sm, Eu, Gd, Tb, Dy, Ho, Er, Tm, Yb and Lu. Of these candidates, Y, La, Pr, Nd, Gd and Tb are preferred.

Examples of alkaline earth metals to be contained in the the zirconium complex oxide and/or the cerium complex oxide include Be, Mg, Ca, Sr, Ba and Ra. Of these candidates, Mg and Ca are preferred.

According to the present invention, the Pt- and Rh-carrying particles of the zirconium complex oxide and the Pt- and Rh-carrying particles of the cerium complex oxide are contained in the same layer of the catalytic coating. As previously described, the zirconium complex oxide provides good heat resistance, whereas the cerium complex oxide provide good OSC. However, since the zirconium complex oxide contains Ce (as cerium dioxide), it also provides a certain degree of OSC. Thus, even if the catalytic activity of Pt and Rh carried on the particles of the cerium complex oxide lowers as a result of exposure to high temperature for a long time, Pt and Rh carried on the particles of the zirconium complex oxide having high heat resistance survive to effectively remove harmful substances from the exhaust gas. This is why the Pt- and Rh-carrying particles of the zirconium complex oxide and the Pt- and Rh-carrying particles of the cerium complex oxide are contained in the same layer of the catalytic coating.

According to the present invention, each of the zirconium complex oxide and the cerium complex oxide coexistently carries Pt and Rh. Pt is particularly effective for removing Co and HC by oxidation, whereas Rh is particularly effective for removing $NO_x$ by reduction while also being effective for removing CO and HC by oxidation. Thus, if Pt and Rh are coexistently carried on each of the zirconium complex oxide and the cerium complex oxide, it is possible to realize both oxidation (of CO and HC) and reduction (of $NO_x$) in a well balanced manner. Further, if Pt alone is carried on the complex oxide, the particles of Pt exhibit a tendency to grow due to the mass transfer of Pt at high temperature. By contrast, if Rh coexists, it restrains the mass transfer of Pt to prevent grain growth (presumably due to the formation of a rhodium oxide layer on the Pt particles which restrains the mass transfer of Pt). Moreover, Pt will not alloy with Rh at high temperature to result in loss or decrease of their respective catalytic activity.

The heat-resistant support, which maybe made of cordierite, mullite, α-alumina or a metal (e.g. stainless steel), should preferably have a honeycomb structure. In producing the catalytic converter, the Pt- & Rh-carrying particles of the zirconium complex oxide and the Pt- & Rh-carrying particles of the cerium complex oxide may be coated together, by the known wash-coating method, over the honeycomb support.

Preferably, the amount of Rh carried on the zirconim complex oxide may be no less than the amount of Rh carried on the cerium complex oxide. As previously described, the zirconium complex oxide is higher in heat resistance than the cerium complex oxide, whereas Rh is catalytically better than Pt with respect to reduction of $NO_x$. Thus, for maintaining the catalytic activity of the catalytic converter for a longer period, a large amount of Rh having a higher $NO_x$-reducing ability should be carried on the zirconium complex oxide which has a higher heat resistance. Specifically, the ratio of the amount of Rh carried on the zirconim complex oxide to the amount of Rh carried on the cerium complex oxide may be 1/1~19/1, particularly 1/1~5/1.

On the other hand, the amount of Pt carried on the cerium complex oxide may be no less than the amount of Pt carried on the zirconim complex oxide.

In a first embodiment of the present invention, the catalytic coating includes only a single layer in which the Pt- & Rh-carrying particles of zirconim complex oxide and the Pt- & Rh-carrying particles of cerium complex oxide are contained.

Preferably, the single layer of the catalytic coating may also contain particles of alumina. The added alumina improves the heat resistance of the catalytic coating as a whole. Further, the added alumina also adsorbs harmful substances from the exhaust gas to assist Pt and Rh in removing these substances.

Preferably, the particles of alumina may carry Pd which provides good catalytic activity at relatively low temperature particularly with respect to removal of hydrocarbons (HC). Thus, the catalytic converter is capable of effectively cleaning exhaust gas even before the engine is sufficiently warmed up. In this regard, Pd is selectively carried on the particles of alumina because Pd is likely to alloy with Rh to result in loss of their respective catalytic activity if these precious metals are carried on the same particles.

Preferably, the single layer of the catalytic coating may further contain barium sulfate for preventing Pd from being poisoned with HC contained in the exhaust gas. Since barium sulfate is thermally stable, it will not decompose at high temperature of no less than 1,000° C., so that the catalytic converter can maintain its catalytic performance for a long time.

Preferably, the single layer of the coating may have a surface portion carrying at least one of Pt and Rh. This structure is advantageous in that the catalytic converter is capable of removing harmful substances even before substances diffuse sufficiently into the catalytic coating.

According to a second embodiment of the present invention, the catalytic coating includes a first layer which is formed on the heat-resistant support and contains Pd-carrying particles of alumina, and a second coating layer which is formed on the first coating layer and contains the Pt- & Rh-carrying particles of zirconium complex oxide and the Pt- & Rh-carrying particles of cerium complex oxide. Preferably, the first coating layer may also contain barium sulfate.

According to a third embodiment of the present invention, the catalytic coating includes a first coating layer which is formed on the heat-resistant support and contains the Pt- & Rh-carrying particles of zirconium complex oxide and the Pt-& Rh-carrying particles of cerium complex oxide, and a second layer which is formed on the first layer and contains Pd-carrying particles of alumina. Preferably, the second coating layer may also contain barium sulfate.

The zirconium complex oxide (and the cerium complex oxide as well) used in the present invention may be prepared by using known techniques such as coprecipitation process or alkoxide process.

The coprecipitation process includes the steps of preparing a solution which contains respective salts of cerium, zirconium and optionally alkaline earth metal(s) and/or other rare earth element(s) (not including Ce and Zr) in a predetermined stoichiometric ratio, then adding an aqueous alkaline solution or an organic acid to the salt solution for causing the respective salts to coprecipitate, and thereafter heat-treating the resulting coprecipitate for oxidization to provide a target complex oxide.

Examples of salts of alkaline earth metal(s) and rare earth element(s) (including Ce and Zr) include sulfates, nitrates, hydrochlorides, phosphates, acetates, oxalates, oxychloride, oxynitrate, oxysulfate and oxyacetate.

Examples of aqueous alkaline solutions for coprecipitation include an aqueous solution of sodium carbonate, aqueous ammonia, an aqueous solution of ammonium carbonate and an aqueous solution of sodium hydroxide. Examples of organic acids for coprecipitation include oxalic acid and citric acid.

The heat treatment in the coprecipitation process includes a heat-drying step for drying the coprecipitate at about 50~200° C. for about 1~48 hours after filtration, and a baking step for baking the coprecipitate at about 350~1,000° C. (preferably about 400~800° C.) for about 1~12 hours. During the baking step, the baking conditions (the baking temperature and the baking period) should be selected depending on the composition of the complex oxide so that at least part of the complex oxide is in the form of solid solution.

The alkoxide process includes the steps of preparing an alkoxide mixture solution which contains cerium, zirconium and optionally alkaline earth metal(s) and/or other rare earth element(s) (not including Ce and Zr) in a predetermined stoichiometric ratio, then adding a deionized water to the alkoxide mixture solution for hydrolysis, and thereafter heat-treating the resulting hydrolysate to provide a target cerium complex oxide.

Examples of alkoxides usable for preparing the alkoxide mixture solution include respective methoxides, ethoxides, propoxides and butoxides of cerium, zirconium, alkaline earth metal(s) and/or other rare earth element(s). Instead, ethylene oxide addition salts of each of these elements are also usable.

The heat treatment in the alkoxide process may be performed in the same way as that in the coprecipitation process.

Pt and Rh may be supported on the cerium complex oxide particles by using known techniques. For instance, a solution containing a salt (e.g. 1~20 wt %) of Pt or Rh is first prepared, the complex oxide is then impregnated with the salt-containing solution, and thereafter the complex oxide is heat-treated. Examples of salts usable for this purpose include nitrate, dinitro diammine nitrate, and chloride. The heat-treatment, which is performed after impregnation and filtration, may include drying the cerium complex oxide by heating at about 50~200° C. for about 1~48 hours and thereafter baking the complex oxide at about 350~1,000° C. (preferably about 400~800° C.) for about 1~12 hours (preferably about 2~4 hours). Similarly, Pd may be supported on alumina substantially in the same manner.

As previously described, the Pt- & Rh-carrying particles of the zirconium complex oxide, the Pt- & Rh-carrying particles of the cerium complex oxide and optionally the Pd-carrying particles of alumina may be coated on the heat-resistant honeycomb support by the known wash-coating method. For forming a mono-layer catalytic coating, specifically, the wash-coating process includes the steps of preparing an aqueous slurry which contains Pt- & Rh-carrying particles of the zirconium complex oxide, Pt- & Rh-carrying particles of the cerium complex oxide and optionally Pd-carrying particles of alumina, immersing the honeycomb support in the slurry, and baking the honeycomb support at a temperature of 600° C. for 3 hours for example. If poisoning-preventive barium sulfate is to be contained in the catalytic coating, the sulfate needs only to be added to the slurry. A multi-layer catalytic coating may be formed by repeating a similar step.

For supporting Pt and/or Rh on a surface portion of the catalytic coating, the surface portion is impregrated with a salt solution containing Pt and/or Rh and heat-treated at a temperature of 600° C. for 3 hours for example.

Other features and advantages of the present invention will be apparent from the following detailed description of the preferred embodiments given with reference to the accompanying drawings.

DETAILED DESCRIPTION OF THE PREFERRED EMBODIMENTS

Figure 1:
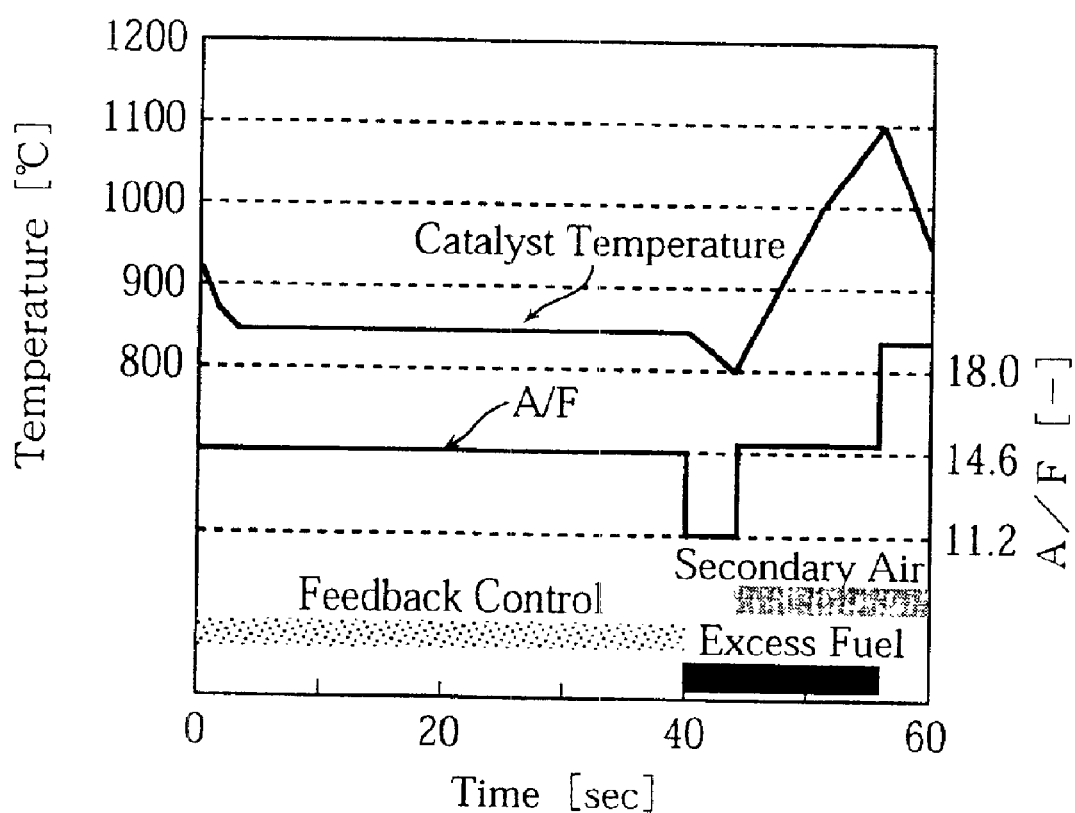
FIG. 1 is a graph showing a high-temperature aging cycle used for evaluating different catalytic converters.

Various examples of the present invention will be described below together with comparative examples. However, it should be understood that the present invention is not limited to these examples.

EXAMPLE 1

In this example, zirconium complex oxide having the composition of $Zr_{0.80}Ce_{0.16}La_{0.04}O_{1.98}$ (hereafter abbreviated as "ZCL") and cerium complex oxide having the composition of $Ce_{0.55}Zr_{0.38}Y_{0.07}O_{1.97}$ (hereafter abbreviated as "CZY①") were first prepared.

Then, Pt and Rh were supported on ZCL and CZY①.

Then, Pt- & Rh-carrying ZCL and Pt- & Rh-carrying CZY① were wash-coated on a monolithic honeycomb support together with CZY① (not supporting any precious metal) and alumina ($Al_2O_3$) to provide a target catalytic converter.

Then, the obtained catalytic converter was subjected to 1,100° C.-aging and thereafter evaluated for its catalytic performance by determining CO—$NO_x$ cross point removal ratio, HC removal ratio and HC50% removal temperature. The results of the performance evaluation are shown in Table 1 below.

(Heat Resistant Support)

The heat-resistant support used in Example 1 was a cylindrical monolithic honeycomb support which was made of cordierite and which had a wall thickness of 0.1 mm, a cell density of 600 cells/$in^2$, a diameter of 105 mm, a length of 171 mm, and a volume of 1.5 $dm^3$.

(Preparation of Complex Oxide)

ZCL and CZY① used in Example 1 were prepared by the so-called alkoxide process.

With respect to ZCL, an alkoxide mixture solution was first prepared by dissolving, in 200 $cm^3$ of toluene, 0.16 mol of zirconium methoxypropylate, 0.032 mol of cerium methoxypropylate, and 0.08 mol of lanthanum methoxypropylate. Then, 80 cm$^3$ of deionized water was gradually dripped into the alkoxide mixture solution for causing hydrolysis of the alkoxide mixture. Then, the toluene and water content of the alkoxide mixture solution was removed by vaporization. Then, the remaining hydrolysate (precursor) was dried at 60° C. for 24 hours and thereafter baked in an electric oven at 450° C. for 3 hours, thereby providing powder of target ZCL.

With respect to CZY①, an alkoxide mixture solution was first prepared by dissolving, in 200 cm$^3$ of toluene, 0.11 mol of cerium methoxypropylate, 0.076 mol of zirconium methoxypropylate, and 0.014 mol of yttrium methoxypropylate. Then, 80 cm$^3$ of deionized water was gradually dripped into the alkoxide mixture solution for causing hydrolysis of the alkoxide mixture. Then, the toluene and water content of the alkoxide mixture solution was removed by vaporization. Then, the remaining hydrolysate (precursor) was dried at 60° C. for 24 hours and thereafter baked in an electric oven at 450° C. for 3 hours, thereby providing powder of target CZY①.

(Preparation of Catalyst-Supporting Complex Oxide)

Powder of ZCL (prepared as above) was impregnated with an aqueous solution of dinitro diammineplatinum nitrate (Pt content: 0.8 wt % relative to the weight of ZCL). The thus impregnated ZCL powder was first dried and then baked at 600° C. for 3 hours. As a result, the ZCLN powder was made to support or carry Pt.

Then, powder of Pt-carrying ZCL (prepared as above) was impregnated with an aqueous solution of rhodium nitrate (Rh content: 0.6 wt % relative to the weight of ZCL). The thus impregnated ZCL powder was first dried and then baked at 600° C. for 3 hours. As a result, the ZCL powder was made to support or carry both of Pt and Rh.

On the other hand, powder of CZY① was made to support or carry both of Pt and Rh in the same manner as the powder of ZCL.

(Formation of Catalytic Coating)

For fabricating the desired catalytic converter, the Pt-& Rh-supporting ZCL powder and the Pt- & Rh-supporting CZY ① powder were mixed with additional CZY① powder (not supporting any precious metal) and alumina powder in a ball mill and wet-crushed to provide a mixture slurry. The mixture slurry was then coated on the monolithic honeycomb support (as referred to above). The thus coated honeycomb support was dried and then baked at 600° C. for 3 hours, thereby providing the target catalytic converter.

The thus obtained mono-layer catalytic coating of the catalytic converter contained, per dm$^3$ (apparent volume) of the honeycomb support, 50 g of Pt- & Rh-supporting ZCL, 0.4 g of Pt (as supported selectively on ZCL), 0.3 g of Rh (as supported selectively on ZCL), 50 g of Pt- & Rh-supporting CZY①, 0.4 g of Pt (as supported selectively on CZY①, 0.3 g of Rh (as supported selectively on CZY①, 30 g of CZY① (not supporting any precious metal), and 50 g of alumina. The ratio of the amount of Pt supported on ZCL to the amount of Pt supported on CZY① (was 1/1. Similarly, the ratio of the amount of Rh supported on ZCL to the amount of Rh supported on CZY① was 1/1.

(1,100° C. Aging)

The catalytic converter in Example 1 was subjected to 1,100° C. aging wherein the catalytic converter was mounted on one bank (4 cylinders) of a 4-liter V8-engine which was actually installed on a car, and the engine exhaust gas was introduced into the converter. Specifically, the cycle illustrated in FIG. 1 and continuing for 60 seconds was repeated 3,000 times for a total period of 50 hours.

As shown in FIG. 1, the cycle included a stoichiometric running period (0~40 sec.) wherein the engine is set to run with the feed of stoichiometric air-fuel mixture (A/F=14.6) under feedback control so that the inside temperature of the converter was held at about 850° C. The stoichiometric running period was followed by a fuel-rich period (40~44 sec.) wherein the engine was set to run with the feed of excessive fuel (A/F=11.2) under interruption of the feedback control. The fuel-rich period was then followed by a temperature-rise period (44~56 sec.) wherein the engine continued to run with the feed of excessive fuel under continued interruption of the feedback control but wherein secondary air was introduced from outside the engine into the catalytic converter for reacting the excess fuel with the secondary air within the converter, thereby causing the temperature to rise to a maximum of 1,100° C. The air-fuel mixture supplied to the combination of the engine and the catalytic converter in this temperature-rise period was slightly fuel-lean (A/F=14.8). The temperature-rise period is followed by a lean-running period (56~60 sec.) wherein the feedback control resumes with respect to the engine with the converter held in the fuel-lean state under continued supply of the secondary air.

It should be mentioned here that the temperature within the catalytic converter was detected by a thermocouple inserted in the honeycomb support.

(Determination of CO—NO$_x$ Cross Point Removal and HC Removal)

After the above-described aging, the catalytic converter was evaluated for its catalytic performance by determining CO—NO$_x$ cross point removal ratio and HC removal ratio, as follows.

The engine was run with an air-fuel mixture which continuously varied from a fuel-rich state to a fuel-lean state, and the resulting exhaust gas was introduced into the catalytic converter for removal of harmful gases such as CO and NO$_x$. The removal ratios for CO and NO$_x$, respectively, were measured to determine the CO—NO$_x$ cross point removal ratio at which the CO-removal ratio coincided with the NO$_x$-removal ratio. Further, the HC removal ratio of the catalytic converter was also measured at the CO—NO$_x$ cross point.

In determining the CO—NO$_x$ cross point removal ratio and the HC removal ratio, the engine was used without stalling on a car, and the exhaust gas was supplied to the catalytic converter at 460° C. with a space velocity (SV) of 90,000/h.

(HC50% Removal Temperature)

On the other hand, the catalytic converter was supplied with exhaust gas with a constant temperature rise of 30° C./min. while the engine continued to run with stoichiometric air-fuel mixture, and determination was made as to the temperature at which 50% removal was achieved with respect to the hydrocarbons (HC) of the exhaust gas.

In the HC50% removal temperature determination, the exhaust gas was introduced into the catalytic converter at a space velocity (SV) of 90,000/h, and the air-fuel mixture supplied to the engine was generally stoichiometric (A/F= 14.6) under the feedback control with a fluctuation of ±0.2.

EXAMPLE 2

In Example 2, zirconium complex oxide having the composition of $Zr_{0.78}Ce_{0.16}La_{0.02}Nd_{0.04}O_{1.97}$ (hereafter abbreviated as "ZCLN") and cerium complex oxide having the composition of $Ce_{0.50}Zr_{0.45}Y_{0.05}O_{1.98}$ (hereafter abbreviated as "CZY②") were prepared and treated to coexistently support Pt and Rh substantially in the same manner as in Example 1.

Then, Pt- & Rh-carrying ZCLN and Pt- & Rh-carrying CZY②  were wash-coated on a monolithic honeycomb support together with alumina ($Al_2O_3$) to provide a target catalytic converter substantially in the same manner as in Example 1. The obtained mono-layer catalytic coating of the catalytic converter contained, per $dm^3$ (apparent volume) of the honeycomb support, 50 g of Pt- & Rh-supporting ZCLN, 0.4 g of Pt (as supported selectively on ZCLN), 0.45 g of Rh (as supported selectively on ZCLN), 75 g of Pt- & Rh-supporting CZY②, 0.4 g of Pt (as supported selectively on CZY②), 0.15 g of Rh (as supported selectively on CZY②) and 55 g of alumina. The ratio of the amount of Pt supported on ZCLN to the amount of Pt supported on CZY② was 1/1, whereas the ratio of the amount of Rh supported on ZCLN to the amount of Rh supported on CZY② was 3/1.

Then, the obtained catalytic converter was subjected to 1,100° C.-aging (FIG. 1) and thereafter evaluated for its catalytic performance by determining CO—$NO_x$ cross point removal ratio, HC removal ratio and HC50% removal temperature substantially in the same manner as in Example 1. The results of the performance evaluation are also shown in Table 1 below.

EXAMPLE 3

In Example 3, zirconium complex oxide having the composition of $Zr_{0.80}Ce_{0.16}La_{0.04}O_{1.98}$ (ZCL) and cerium complex oxide having the composition of $Ce_{0.60}Zr_{0.32}Y_{0.08}O_{1.96}$ (hereafter abbreviated as "CZY③") were prepared and treated to coexistently support Pt and Rh substantially in the same manner as in Example 1.

Then, Pt- & Rh-carrying ZCL and Pt- & Rh-carrying CZY③ were wash-coated on a monolithic honeycomb support together with alumina ($Al_2O_3$) to provide a target catalytic converter substantially in the same manner as in Example 1. The obtained mono-layer catalytic coating of the catalytic converter contained, per $dm^3$ (apparent volume) of the honeycomb support, 50 g of Pt- & Rh-supporting ZCL, 0.4 g of Pt (as supported selectively on ZCL), 0.5 g of Rh (as supported selectively on ZCL), 90 g of Pt- & Rh-supporting CZY③, 0.4 g of Pt (as supported selectively on CZY③), 0.1 g of Rh (as supported selectively on CZY③) and 80 g of alumina. The ratio of the amount of Pt supported on ZCL to the amount of Pt supported on CZY③ was 1/1, whereas the ratio of the amount of Rh supported on ZCL to the amount of Rh supported on CZY③ was 5/1.

Then, the obtained catalytic converter was subjected to 1,100° C.-aging (FIG. 1) and thereafter evaluated for its catalytic performance by determining CO—$NO_x$ cross point removal ratio, HC removal ratio and HC50% removal temperature substantially in the same manner as in Example 1. The results of the performance evaluation are also shown in Table 1 below.

EXAMPLE 4

In Example 4, zirconium complex oxide having the composition of $Zr_{0.78}Ce_{0.16}La_{0.02}Nd_{0.04}O_{1.97}$ (ZCLN) and cerium complex oxide having the composition of $Ce_{0.50}Zr_{0.45}Y_{0.05}O_{1.98}$ (CZY②) were prepared and treated to coexistently support Pt and Rh substantially in the same manner as in Example 1.

Then, Pt- & Rh-carrying ZCLN and Pt- & Rh-carrying CZY② were wash-coated on a monolithic honeycomb support together with alumina ($Al_2O_3$) to provide a target catalytic converter substantially in the same manner as in Example 1. The obtained mono-layer catalytic coating of the catalytic converter contained, per $dm^3$ (apparent volume) of the honeycomb support, 50 g of Pt- & Rh-supporting ZCLN, 0.4 g of Pt (as supported selectively on ZCLN), 0.34 g of Rh (as supported selectively on ZCLN), 75 g of Pt- & Rh-supporting CZY②, 0.4 g of Pt (as supported selectively on CZY②), 0.11 g of Rh (as supported selectively on CZY②) and 55 g of alumina. The ratio of the amount of Pt supported on ZCLN to the amount of Pt supported on CZY②) was 1/1, whereas the ratio of the amount of Rh supported on ZCLN to the amount of Rh supported on CZY② was 3/1.

Then, the obtained catalytic converter was subjected to 1,100° C.-aging (FIG. 1) and thereafter evaluated for its catalytic performance by determining CO—$NO_x$ cross point removal ratio, HC removal ratio and HC50% removal temperature substantially in the same manner as in Example 1. The results of the performance evaluation are also shown in Table 1 below.

[Comparison 1]

In Comparison 1, zirconium dioxide (zirconia or $ZrO_2$ abbreviated as "Z") and cerium complex oxide having the composition of $Ce_{0.80}Zr_{0.20}O_{2.00}$ (abbreviated as "CZ") were prepared and treated to coexistently support Pt and Rh substantially in the same manner as in Example 1.

Then, Pt- & Rh-carrying Z and Pt- & Rh-carrying CZ were wash-coated on a monolithic honeycomb support together with alumina ($Al_2O_3$) to provide a target catalytic converter substantially in the same manner as in Example 1. The obtained mono-layer catalytic coating of the catalytic converter contained, per $dm^3$ (apparent volume) of the honeycomb support, 50 g of Pt- & Rh-supporting Z, 0.4 g of Pt (as supported selectively on Z), 0.5 g of Rh (as supported selectively on Z), 75 g of Pt- & Rh-supporting CZ, 0.4 g of Pt (as supported selectively on CZ), 0.7 g of Rh (as supported selectively on CZ) and 55 g of alumina. The ratio of the amount of Pt supported on Z to the amount of Pt supported on CZ was 1/1, whereas the ratio of the amount of Rh supported on Z to the amount of Rh supported on CZ was 5/7.

Then, the obtained catalytic converter was subjected to 1,100° C.-aging (FIG. 1) and thereafter evaluated for its catalytic performance by determining CO—$NO_x$ cross point removal ratio, HC removal ratio and HC50% removal temperature substantially in the same manner as in Example 1. The results of the performance evaluation are also shown in Table 1 below.

TABLE 1

| | Coating Composition [g/$dm^3$-cat.] | CO—$NO_x$ Cross Point Removal [%] | HC Removal [%] | HC50% Removal Temp. [° C.] |
|---|---|---|---|---|
| Ex. 1 | Pt—Rh(0.4–0.3)/ZCL(50) Pt—Rh(0.4–0.3)/CZY①(50) CZY①(30) $Al_2O_3$(50) | 98.7 | 95.9 | 312 |
| Ex. 2 | Pt—Rh(0.4–0.45)/ZCLN(50) Pt—Rh(0.4–0.15)/CZY②(75) $Al_2O_3$(55) | 99.1 | 98.7 | 305 |
| Ex. 3 | Pt—Rh(0.4–0.5)/ZCL(50) Pt—Rh(0.4–0.1)/CZY③(90) $Al_2O_3$(80) | 98.4 | 97.4 | 319 |
| Ex. 4 | Pt—Rh(0.4–0.34)/ZCLN(50) Pt—Rh(0.4–0.11)/CZY②(75) $Al_2O_3$(55) | 97.3 | 97.6 | 321 |

TABLE 1-continued

| Coating Composition [g/dm$^3$-cat.] | CO—NO$_x$ Cross Point Removal [%] | HC Removal [%] | HC50% Removal Temp. [° C.] |
|---|---|---|---|
| Comparison 1 | Pt—Rh(0.4–0.5)/Z(50) Pt—Rh(0.4–0.7)/CZ(75) Al$_2$O$_3$(55) | 86.2 | 87.2 | 363 |

ZCL: $Zr_{0.80}Ce_{0.16}La_{0.04}O_{1.98}$
ZCLN: $Zr_{0.78}Ce_{0.16}La_{0.02}Nd_{0.04}O_{1.97}$
CZY①: $Ce_{0.55}Zr_{0.38}Y_{0.07}O_{1.97}$
CZY②: $Ce_{0.5}Zr_{0.45}Y_{0.05}O_{1.98}$
CZY③: $Ce_{0.60}Zr_{0.32}Y_{0.08}O_{1.96}$
CZ: $Ce_{0.8}Zr_{0.2}O_2$
Z: $ZrO_2$

[Evaluation of Table 1]

As appreciated from Table 1, the catalytic converter according to each of Examples 1~4 exhibited higher CO—NO$_x$ cross point removal ratio, higher HC removal ratio and lower HC50% removal temperature than the catalytic converter according to Comparison 1. In Comparison 1, one of the oxides which coexistently supported Pt and Rh was zirconia but not zirconium complex oxide. Further, in Comparison 1, a higher amount of Rh was supported on cerium complex oxide (CZ) than on zirconia (Z). By contrast, in each of Examples 1~4, Pt and Rh were coexistently supported not only on the cerium complex oxide but also on the zirconium complex oxide, and the amount of Rh supported on the zirconium complex oxide was equal to or larger than the amount of Rh supported on the cerium complex oxide. This was why the catalytic converter according to each of Examples 1~4 exhibited higher catalytic activity even after the high temperature aging, and better HC removal even at low temperature.

EXAMPLE 5

In Example 5, zirconium complex oxide having the composition of $Zr_{0.78}Ce_{0.16}La_{0.02}Nd_{0.04}O_{1.97}$ (ZCLN) and cerium complex oxide having the composition of $Ce_{0.50}Zr_{0.45}Y_{0.05}O_{1.98}$ (CZY ②) were prepared and treated to coexistently support Pt and Rh substantially in the same manner as in Example 1.

Then, Pt- & Rh-carrying ZCLN and Pt- & Rh-carrying CZY② were wash-coated on a monolithic honeycomb support (as specified below) together with alumina (Al$_2$O$_3$) to provide a target catalytic converter substantially in the same manner as in Example 1. The obtained mono-layer catalytic coating of the catalytic converter contained, per dm$^3$ (apparent volume) of the honeycomb support, 50 g of Pt- & Rh-supporting ZCLN, 0.75 g of Pt (as supported selectively on ZCLN), 1.0 g of Rh (as supported selectively on ZCLN), 75 g of Pt- & Rh-supporting CZY②, 0.75 g of Pt (as supported selectively on CZY②), 0.3 g of Rh (as supported selectively on CZY②) and 55 g of alumina. The ratio of the amount of Pt supported on ZCLN to the amount of Pt supported on CZY② was 1/1, whereas the ratio of the amount of Rh supported on ZCLN to the amount of Rh supported on CZY② was 10/3.

Then, the obtained catalytic converter was subjected to 1,100° C.-aging (severer version as specified below with reference to FIG. 2) and thereafter evaluated for its catalytic performance by determining CO—NO$_x$ cross point removal ratio, HC removal ratio and HC50% removal temperature substantially in the same manner as in Example 1. The results of the performance evaluation are shown in Table 2 below.

(Heat Resistant Support)

The heat-resistant support used in Example 5 was a cylindrical monolithic honeycomb support which was made of cordierite and which had a wall thickness of 0.1 mm, a cell density of 400 cells/in$^2$, a diameter of 105 mm, a length of 171 mm, and a volume of 1.5 dm$^3$.

(1,100° C. Aging: Severer Version)

The catalytic converter in Example 5 was subjected to severer version 1,100° C. aging wherein the catalytic converter was mounted on one bank (4 cylinders) of a 4-liter V8-engine which was actually installed on a car, and the engine exhaust gas was introduced into the converter. Specifically, the cycle illustrated in FIG. 2 (showing two successive cycles) and continuing for 30 seconds was repeated 6,000 times for a total period of 50 hours.

Figure 2:
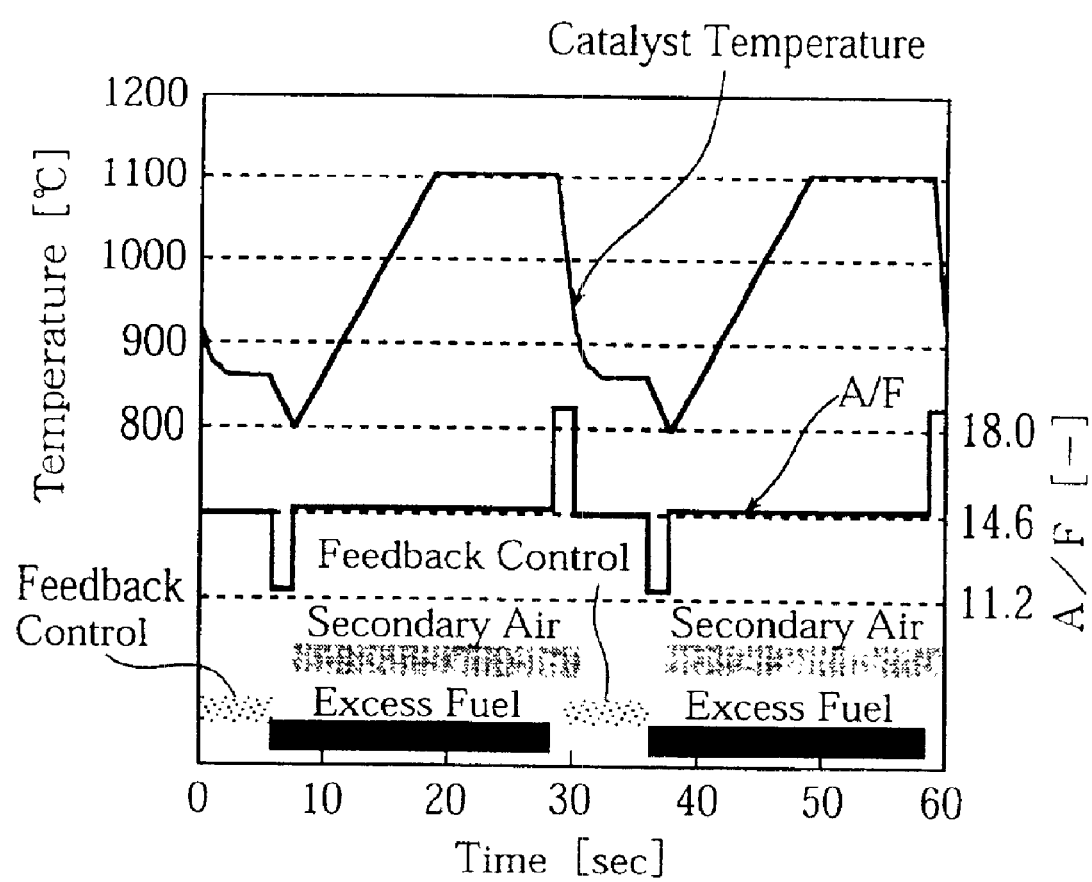
FIG. 2 is a graph showing another high-temperature aging cycle used for evaluating different catalytic converters.

As shown in FIG. 2, the cycle included a stoichiometric running period (0~5 sec.) wherein the engine is set to run with the feed of stoichiometric air-fuel mixture (A/F=14.6) under feedback control so that the inside temperature of the converter was held at about 850° C. The stoichiometric running period was followed by a fuel-rich period (5~7 sec.) wherein the engine was set to run with the feed of excessive fuel (A/F=12.5) under interruption of the feedback control. The fuel-rich period was then followed by a temperature-rise period (7~28 sec.) wherein the engine continued to run with the feed of excessive fuel under continued interruption of the feedback control but wherein secondary air was introduced from outside the engine into the catalytic converter for reacting the excess fuel with the secondary air within the converter, thereby causing the temperature to rise to a maximum of 1,100° C. The air-fuel mixture supplied to the combination of the engine and the catalytic converter in this temperature-rise period was slightly fuel-lean (A/F=14.8). The temperature-rise period is followed by a lean-running period (28~30 sec.) wherein the feedback control resumes with respect to the engine with the converter held in the fuel-lean state under continued supply of the secondary air.

EXAMPLE 6

In Example 6, zirconium complex oxide having the composition of $Zr_{0.78}Ce_{0.16}La_{0.02}Nd_{0.04}O_{1.97}$ (ZCLN) and cerium complex oxide having the composition of $Ce_{0.45}Zr_{0.48}Y_{0.07}O_{1.97}$ (hereafter referred to as "CZY④") were prepared and treated to coexistently support Pt and Rh substantially in the same manner as in Example 1. Further, Pd-supporting alumina (Al$_2$O$_3$) was prepared substantially in the same manner as Pt and Rh were supported on the complex oxide in Example 1 (namely, impregnating alumina with a solution of a Pd-salt and subsequently baking).

Then, Pt- & Rh-carrying ZCLN and Pt- & Rh-carrying CZY④ were wash-coated on a monolithic honeycomb support together with Pd-supporting alumina and barium sulfate (BaSO$_4$) to provide a target catalytic converter substantially in the same manner as in Example 5. The obtained mono-layer catalytic coating of the catalytic converter contained, per dm$^3$ (apparent volume) of the honeycomb support, 50 g of Pt- & Rh-supporting ZCLN, 0.75 g of Pt (as supported selectively on ZCLN), 1.0 g of Rh (as supported selectively on ZCLN), 75 g of Pt- & Rh-supporting CZY④, 1.0 g of Pt (as supported selectively on CZY④), 0.4 g of Rh (as supported selectively on CZY④), 70 g of alumina, 1.5 g of Pd (as supported selectively on alumina), and 20 g of barium sulfate. The ratio of the amount of Pt supported on ZCLN to the amount of Pt supported on CZY④ was 3/4, whereas the ratio of the amount of Rh supported on ZCLN to the amount of Rh supported on CZY④ was 5/2.

Then, the obtained catalytic converter was subjected to 1,100° C.-aging (severer version of FIG. 2) and thereafter evaluated for its catalytic performance by determining CO—NO$_x$ cross point removal ratio, HC removal ratio and HC50% removal temperature substantially in the same manner as in Example 5. The results of the performance evaluation are also shown in Table 2 below.

EXAMPLE 7

In Example 7, zirconium complex oxide having the composition of $Zr_{0.80}Ce_{0.16}La_{0.04}O_{1.98}$ (ZCL) and cerium complex oxide having the composition of $Ce_{0.39}Zr_{0.53}Y_{0.08}O_{1.96}$ (hereafter referred to as "CZY ⑤ ") were prepared and treated to coexistently support Pt and Rh substantially in the same manner as in Example 1.

Then, Pt- & Rh-carrying ZCL and Pt- & Rh-carrying CZY⑤ were wash-coated on a monolithic honeycomb support together with alumina substantially in the same manner as in Example 5.

Then, the wash-coated monolithic support was impregnated with an aqueous solution of dinitro diammineplatinum nitrate and then baked at 600° C. for 3 hours after drying. Further, the wash-coated monolithic support was then impregnated with an aqueous solution of rhodium nitrate and then baked at 600° C. for 3 hours after drying. As a result, the monolithic support was made to support both of Pt and Rh on a surface portion of the catalytic coating, thereby providing a target catalytic converter. The obtained mono-layer catalytic coating of the catalytic converter contained, per dm$^3$ (apparent volume) of the honeycomb support, 50 g of Pt- & Rh-supporting ZCL, 0.75 g of Pt (as supported selectively on ZCL), 1.0 g of Rh (as supported selectively on ZCL), 90 g of Pt- & Rh-supporting CZY ⑤, 0.75 g of Pt (as supported selectively on CZY⑤), 0.3 g of Rh (as supported selectively on CZY⑤), 80 g of alumina, 0.5 g of Pt (as supported on the coating surface), and 1.0 g of Rh (as supported on the coating surface). The ratio of the amount of Pt supported on ZCL to the amount of Pt supported on CZY⑤ was 1/1, whereas the ratio of the amount of Rh supported on ZCLN to the amount of Rh supported on CZY⑤ was 10/3.

Then, the obtained catalytic converter was subjected to 1,100° C.-aging (severer version of FIG. 2) and thereafter evaluated for its catalytic performance by determining CO—NO$_x$ cross point removal ratio, HC removal ratio and HC50% removal temperature substantially in the same manner as in Example 5. The results of the performance evaluation are also shown in Table 2 below.

[Comparison 2]

In Comparison 2, zirconium complex oxide having the composition of $Zr_{0.80}Ce_{0.16}La_{0.04}O_{1.98}$ (ZCL) and cerium complex oxide having the composition of $Ce_{0.05}Zr_{0.50}O_{2.00}$ (hereafter referred to as "CZ") were prepared substantially in the same manner as in Example 1.

Then, ZCL and CZ* were wash-coated on a monolithic honeycomb support together with alumina substantially in the same manner as in Example 5.

Then, the wash-coated monolithic support was impregnated with an aqueous solution of dinitro diammineplatinum nitrate and then baked at 600° C. for 3 hours after drying. Further, the wash-coated monolithic support was then impregnated with an aqueous solution of rhodium nitrate and then baked at 600° C. for 3 hours after drying. As a result, the monolithic support was made to support both of Pt and Rh on a surface portion of the catalytic coating, thereby providing a target catalytic converter. The obtained mono-layer catalytic coating of the catalytic converter contained, per dm$^3$ (apparent volume) of the honeycomb support, 50 g of ZCL, 75 g of CZ*, 55 g of alumina, 1.5 g of Pt (as supported on the coating surface), and 1.3 g of Rh (as supported on the coating surface).

Then, the obtained catalytic converter was subjected to 1,100° C.-aging (severer version of FIG. 2) and thereafter evaluated for its catalytic performance by determining CO—NO$_x$ cross point removal ratio, HC removal ratio and HC50% removal temperature substantially in the same manner as in Example 5. The results of the performance evaluation are also shown in Table 2 below.

TABLE 2

| | Coating Composition [g/dm$^3$-cat.] | CO—NO$_x$ Cross Point Removal [%] | HC Removal [%] | HC50% Removal Temp. [° C.] |
|---|---|---|---|---|
| Ex. 5 | Pt—Rh(0.75–1.0)/ZCLN(50) Pt—Rh(0.75–0.3)/CZY②(75) Al$_2$O$_3$(55) | 95 | 85 | 345 |
| Ex. 6 | Pt—Rh(0.75–1.0)/ZCLN(50) Pt—Rh(1.0–0.4)/CZY④(75) Pd(1.5)/Al$_2$O$_3$(50) BaSO$_4$(20) | 96 | 90 | 320 |
| Ex. 7 | Pt—Rh(0.75–1.0)/ZCL(50) Pt—Rh(0.75–0.3)/CZY⑤(90) Pt—Rh(0.5–1.0)Surface Support Al$_2$O$_3$(80) | 98 | 88 | 315 |
| Comparison 2 | Pt—Rh(1.5–1.3)Surface Support ZCL(50) CZ*(75) Al$_2$O$_3$(55) | 78 | 82 | 370 |

ZCLN: $Zr_{0.78}Ce_{0.16}La_{0.02}Nd_{0.04}O_{1.97}$
ZCL: $Zr_{0.80}Ce_{0.16}La_{0.04}O_{1.98}$
CZY②: $Ce_{0.50}Zr_{0.45}Y_{0.05}O_{1.98}$
CZY④: $Ce_{0.45}Zr_{0.48}Y_{0.07}O_{1.97}$
CZY⑤: $Ce_{0.39}Zr_{0.53}Y_{0.08}O_{1.96}$
CZ*: $Ce_{0.50}Zr_{0.50}O_{2.00}$

[Evaluation of Table 2]

As appreciated from Table 2, the catalytic converter according to each of Examples 5~7 exhibited higher CO—NO$_x$ cross point removal ratio, higher HC removal ratio and lower HC50% removal temperature than the catalytic converter according to Comparison 2. In Comparison 1, the zirconium complex oxide (ZCL) nor the cerium complex oxide (CZ) did not support any precious metal, and Pt and Rh were supported only on the surface of the catalytic coating. By contrast, in each of Examples 5~7, Pt and Rh were coexistently supported not only on the cerium complex oxide but also on the zirconium complex oxide, and the amount of Rh supported on the zirconium complex oxide was equal to or larger than the amount of Rh supported on the cerium complex oxide. This was why the catalytic converter according to each of Examples 5~7 exhibited higher catalytic activity even after the high temperature aging, and better HC removal even at low temperature.

Comparing Examples 5 and 6, it was observed that Pd, when supported on alumina, enhanced the HC removal ratio while lowering the HC50% removal temperature. Similarly, comparing Examples 5 and 7, it was observed that the HC50% removal temperature also lowered when Pt and Rh were supported not only on the zirconium complex oxide and the cerium complex oxide but also on the surface of the catalytic coating.

EXAMPLE 8

In Example 8, zirconium complex oxide having the composition of $Zr_{0.80}Ce_{0.16}La_{0.04}O_{1.98}$ (ZCL) and cerium complex oxide having the composition of $Ce_{0.55}Zr_{0.38}Y_{0.07}O_{1.97}$ (CZY①) were prepared and treated to coexistently support Pt and Rh substantially in the same manner as in Example 1. Further, Pd-supporting alumina ($Al_2O_3$) was prepared substantially in the same manner as Pt and Rh were supported on the complex oxide in Example 1 (namely, impregnating alumina with a solution of a Pd-salt and subsequently baking).

Then, Pd-supporting alumina and barium sulfate ($BaSO_4$) were wash-coated on a monolithic honeycomb support (identical to that used in Example 1) to form a first layer on the monolithic support substantially in the same manner as in Example 1. The obtained first coating layer contained, per $dm^3$ (apparent volume) of the honeycomb support, 70 g of alumina, 1.5 g of Pd (as supported selectively on alumina), and 40 g of barium sulfate.

Then, Pt- & Rh-carrying ZCL and Pt- & Rh-carrying CZY① were wash-coated on the first coating layer together with additional CZY① (not supporting any precious metal) and additional alumina (not supporting any precious metal) to form a second layer substantially in the same manner as in Example 1, thereby providing a target catalytic converter. The second coating layer of the product catalytic converter contained, per $dm^3$ (apparent volume) of the honeycomb support, 50 g of Pt- & Rh-supporting ZCL, 0.75 g of Pt (as supported selectively on ZCL), 0.6 g of Rh (as supported selectively on ZCL), 50 g of Pt- & Rh-supporting CZY①, 0.75 g of Pt (as supported selectively on CZY①), 0.6 g of Rh (as supported selectively on CZY①), 30 g of additional CZY①, and 50 g of additional alumina. The ratio of the amount of Pt supported on ZCL to the amount of Pt supported on CZY① was 1/1, and the ratio of the amount of Rh supported on ZCL to the amount of Rh supported on CZY① was also 1/1.

Then, the obtained catalytic converter was subjected to 1,100° C.-aging (severer version of FIG. 2) and thereafter evaluated for its catalytic performance by determining CO—$NO_x$ cross point removal ratio, HC removal ratio and HC50% removal temperature substantially in the same manner as in Example 5. The results of the performance evaluation are shown in Table 3 below.

EXAMPLE 9

In Example 9, zirconium complex oxide having the composition of $Zr_{0.78}Ce_{0.16}La_{0.02}Nd_{0.04}O_{1.97}$ (ZCLN) and cerium complex oxide having the composition of $Ce_{0.50}Zr_{0.45}Y_{0.05}O_{1.98}$ (CZY②) were prepared and treated to coexistently support Pt and Rh substantially in the same manner as in Example 1. Further, Pd-supporting alumina ($Al_2O_3$) was prepared substantially in the same manner as Pt and Rh were supported on the complex oxide in Example 1.

Then, Pd-supporting alumina and barium sulfate ($BaSO_4$) were wash-coated on a monolithic honeycomb support (identical to that used in Example 1) together with CZY① (not supporting any precious metal) to form a first layer on the monolithic support substantially in the same manner as in Example 1. The obtained first coating layer contained, per $dm^3$ (apparent volume) of the honeycomb support, 50 g of alumina, 1.5 g of Pd (as supported selectively on alumina), 45 g of CZY①, and 20 g of barium sulfate.

Then, Pt- & Rh-carrying ZCLN and Pt- & Rh-carrying CZY② were wash-coated on the first coating layer together with additional alumina (not supporting any precious metal) to form a second layer substantially in the same manner as in Example 1, thereby providing a target catalytic converter. The second coating layer of the product catalytic converter contained, per $dm^3$ (apparent volume) of the honeycomb support, 50 g of Pt-& Rh-supporting ZCLN, 0.75 g of Pt (as supported selectively on ZCLN), 0.9 g of Rh (as supported selectively on ZCLN), 75 g of Pt- & Rh-supporting CZY②, 0.75 g of Pt (as supported selectively on CZY②), 0.3 g of Rh (as supported selectively on CZY②), and 55 g of additional alumina. The ratio of the amount of Pt supported on ZCLN to the amount of Pt supported on CZY② was 1/1, whereas the ratio of the amount of Rh supported on ZCLN to the amount of Rh supported on CZY② was also 3/1.

Then, the obtained catalytic converter was subjected to 1,100° C.-aging (severer version of FIG. 2) and thereafter evaluated for its catalytic performance by determining CO—$NO_x$ cross point removal ratio, HC removal ratio and HC50% removal temperature substantially in the same manner as in Example 5. The results of the performance evaluation are shown in Table 3 below.

EXAMPLE 10

In Example 10, zirconium complex oxide having the composition of $Zr_{0.80}Ce_{0.16}La_{0.04}O_{1.97}$ (ZCL) and cerium complex oxide having the composition of $Ce_{0.60}Zr_{0.32}Y_{0.08}O_{1.96}$ (CZY③) were prepared and treated to coexistently support Pt and Rh substantially in the same manner as in Example 1. Apart from Pt- & Rh-supporting CZY③, Pd-supporting CZY③ was also prepared substantially in the same manner as Pt and Rh were supported on the complex oxide in Example 1.

Then, Pd-supporting CZY③ were wash-coated on a monolithic honeycomb support (identical to that used in Example 1) together with alumina (not supporting any precious metal) and barium sulfate ($BaSO_4$) to form a first layer on the monolithic support substantially in the same manner as in Example 1. The obtained first coating layer contained, per $dM^3$ (apparent volume) of the honeycomb support, 20 g of Pd-supporting CZY③, 1.5 g of Pd (as supported selectively on CZY③), 50 g of alumina, and 20 g of barium sulfate.

Then, Pt- & Rh-carrying ZCL and Pt- & Rh-carrying CZY③ were wash-coated on the first coating layer together with additional alumina (not supporting any precious metal) to form a second layer substantially in the same manner as in Example 1, thereby providing a target catalytic converter. The second coating layer of the product catalytic converter contained, per $dm^3$ (apparent volume) of the honeycomb support, 50 g of Pt- & Rh-supporting ZCL, 0.75 g of Pt (as supported selectively on ZCL), 1.0 g of Rh (as supported selectively on ZCL), 75 g of Pt- & Rh-supporting CZY③, 0.75 g of Pt (as supported selectively on CZY③), 0.2 g of Rh (as supported selectively on CZY③), and 80 g of additional alumina. The ratio of the amount of Pt supported on ZCL to the amount of Pt supported on CZY③ was 1/1, whereas the ratio of the amount of Rh supported on ZCLN to the amount of Rh supported on CZY③ was also 5/1.

Then, the obtained catalytic converter was subjected to 1,100° C.-aging (severer version of FIG. 2) and thereafter evaluated for its catalytic performance by determining CO—$NO_x$ cross point removal ratio, HC removal ratio and HC50% removal temperature substantially in the same manner as in Example 5. The results of the performance evaluation are shown in Table 3 below.

EXAMPLE 11

In Example 11, zirconium complex oxide having the composition of $Zr_{0.78}Ce_{0.16}La_{0.02}Nd_{0.04}O_{1.97}$ (ZCLN) and cerium complex oxide having the composition of $Ce_{0.50}Zr_{0.04}Y_{0.05}O_{1.98}$ (CZY②) were prepared and treated to coexistently support Pt and Rh substantially in the same manner as in Example 1. Further, Pd-supporting alumina ($Al_2O_3$) was prepared substantially in the same manner as Pt and Rh were supported on the complex oxide in Example 1.

Then, Pd-supporting alumina and barium sulfate ($BaSO_4$) were wash-coated on a monolithic honeycomb support (identical to that used in Example 1) together with CZY② (not supporting any precious metal) to form a first layer on the monolithic support substantially in the same manner as in Example 1. The obtained first coating layer contained, per $dm^3$ (apparent volume) of the honeycomb support, 50 g of alumina, 1.5 g of Pd (as supported selectively on alumina), 20 g of CZY②, and 20 g of barium sulfate.

Then, Pt- & Rh-carrying ZCLN and Pt- & Rh-carrying CZY② were wash-coated on the first coating layer together with additional alumina (not supporting any precious metal) to form a second layer substantially in the same manner as in Example 1, thereby providing a target catalytic converter. The second coating layer of the product catalytic converter contained, per $dm^3$ (apparent volume) of the honeycomb support, 50 g of Pt- & Rh-supporting ZCLN, 0.75 g of Pt (as supported selectively on ZCLN), 0.67 g of Rh (as supported selectively on ZCLN), 75 g of Pt- & Rh-supporting CZY②, 0.75 g of Pt (as supported selectively on CZY②), 0.23 g of Rh (as supported selectively on CZY②), and 55 g of additional alumina. The ratio of the amount of Pt supported on ZCLN to the amount of Pt supported on CZY② was 1/1, whereas the ratio of the amount of Rh supported on ZCLN to the amount of Rh supported on CZY② was also 67/23.

Then, the obtained catalytic converter was subjected to 1,100° C.-aging (severer version of FIG. 2) and thereafter evaluated for its catalytic performance by determining CO—$NO_x$ cross point removal ratio, HC removal ratio and HC50% removal temperature substantially in the same manner as in Example 5. The results of the performance evaluation are shown in Table 3 below.

[Comparison 3]

In Comparison 3, zirconium dioxide (Z) and cerium complex oxide having the composition of $Ce_{0.80}Zr_{0.20}O_{2.00}$ (CZ) were prepared and treated to coexistently support Pt and Rh substantially in the same manner as in Example 1. Further, Pd-supporting alumina ($Al_2O_3$) was prepared substantially in the same manner as Pt and Rh were supported on the complex oxide in Example 1.

Then, Pd-supporting alumina was wash-coated on a monolithic honeycomb support (identical to that used in Example 1) together with CZ (not supporting any precious metal) to form a first layer on the monolithic support substantially in the same manner as in Example 1. The obtained first coating layer contained, per $dm^3$ (apparent volume) of the honeycomb support, 50 g of alumina, 1.5 g of Pd (as supported selectively on alumina), and 45 g of CZ.

Then, Pt- & Rh-carrying Z and Pt- & Rh-carrying CZ were wash-coated on the first coating layer together with additional alumina (not supporting any precious metal) to form a second layer substantially in the same manner as in Example 1, thereby providing a target catalytic converter. The second coating layer of the product catalytic converter contained, per $dM^3$ (apparent volume) of the honeycomb support, 50 g of Pt- & Rh-supporting Z, 0.75 g of Pt (as supported selectively on Z), 0.5 g of Rh (as supported selectively on Z), 75 g of Pt- & Rh-supporting CZ, 0.75 g of Pt (as supported selectively on CZ), 0.7 g of Rh (as supported selectively on CZ), and 55 g of additional alumina. The ratio of the amount of Pt supported on Z to the amount of Pt supported on CZ was 1/1, whereas the ratio of the amount of Rh supported on Z to the amount of Rh supported on CZ was also 5/7.

Then, the obtained catalytic converter was subjected to 1,100° C.-aging (severer version of FIG. 2) and thereafter evaluated for its catalytic performance by determining CO—$NO_x$ cross point removal ratio, HC removal ratio and HC50% removal temperature substantially in the same manner as in Example 5. The results of the performance evaluation are shown in Table 3 below.

[Comparison 4]

In Comparison 4, zirconium dioxide (Z) and cerium complex oxide having the composition of $Ce_{0.80}Zr_{0.20}O_{2.00}$ (CZ) were prepared and treated to coexistently support Pt and Rh substantially in the same manner as in Example 1. Further, apart from Pt- & Rh-supporting CZ, Pd-supporting CZ was prepared substantially in the same manner as Pt and Rh were supported on the complex oxide in Example 1.

Then, Pd-supporting CZ was wash-coated on a monolithic honeycomb support (identical to that used in Example 1) together with alumina (not supporting any precious metal) to form a first layer on the monolithic support substantially in the same manner as in Example 1. The obtained first coating layer contained, per $dm^3$ (apparent volume) of the honeycomb support, 45 g of CZ, 1.5 g of Pd (as supported selectively on CZ), and 60 g of alumina.

Then, Pt- & Rh-carrying Z and Pt- & Rh-carrying CZ were wash-coated on the first coating layer together with additional alumina (not supporting any precious metal) to form a second layer substantially in the same manner as in Example 1, thereby providing a target catalytic converter. The second coating layer of the product catalytic converter contained, per $dm^3$ (apparent volume) of the honeycomb support, 55 g of Pt- & Rh-supporting Z, 0.75 g of Pt (as supported selectively on Z), 0.5 g of Rh (as supported selectively on Z), 70 g of Pt- & Rh-supporting CZ, 0.75 g of Pt (as supported selectively on CZ), 0.7 g of Rh (as supported selectively on CZ), and 45 g of additional alumina. The ratio of the amount of Pt supported on Z to the amount of Pt supported on CZ was 1/1, whereas the ratio of the amount of Rh supported on Z to the amount of Rh supported on CZ was also 5/7.

Then, the obtained catalytic converter was subjected to 1,100° C.-aging (severer version of FIG. 2) and thereafter evaluated for its catalytic performance by determining CO—$NO_x$ cross point removal ratio, HC removal ratio and HC50% removal temperature substantially in the same manner as in Example 5. The results of the performance evaluation are shown in Table 3 below.

TABLE 3

| | Coating Composition [g/dm³-cat.] | | CO—$NO_x$ Cross Point Removal [%] | HC Removal [%] | HC50% Removal Temp. [° C.] |
|---|---|---|---|---|---|
| | 1st. Layer | 2nd. Layer | | | |
| Ex. 8 | Pd(1.5)/$Al_2O_3$(70) $BaSO_4$(40) | Pt—Rh(0.75–0.6)/ZCL(50) Pt—Rh(0.75–0.6)/CZY①(50) CZY①(30) $Al_2O_3$(50) | 97.6 | 94.3 | 326 |
| Ex. 9 | Pd(1.5)/$Al_2O_3$(50) CZY①(45) $BaSO_4$(20) | Pt—Rh(0.75–0.9)/ZCLN(50) Pt—Rh(0.75–0.3)/CZY②(75) $Al_2O_3$(55) | 98.6 | 95.8 | 321 |
| Ex. 10 | Pd(1.5)/CZY③(20) $Al_2O_3$(50) $BaSO_4$(20) | Pt—Rh(0.75–1.0)/ZCL(50) Pt—Rh(0.75–0.2)/CZY③(90) $Al_2O_3$(80) | 97.3 | 91.2 | 331 |
| Ex. 11 | Pd(1.5)/$Al_2O_3$(50) $BaSO_4$(20) CZY②(20) | Pt—Rh(0.75–0.67)/ZCLN(50) Pt—Rh(0.75–0.23)/CZY②(75) $Al_2O_3$(55) | 97.1 | 92.7 | 334 |
| Comparison 3 | Pd(1.5)/$Al_2O_3$(50) CZ(45) | Pt—Rh(0.75–0.5)/Z(50) Pt—Rh(0.75–0.7)/CZ(75) $Al_2O_3$(55) | 76.2 | 82.5 | 381 |
| Comparison 4 | Pd(1.5)/CZ(45) $Al_2O_3$(60) | Pt—Rh(0.75–0.5)/Z(55) Pt—Rh(0.75–0.7)/CZ(70) $Al_2O_3$(45) | 79.2 | 78.6 | 389 |

ZCL: $Zr_{0.80}Ce_{0.16}La_{0.04}O_{1.98}$
ZCLN: $Zr_{0.78}Ce_{0.16}La_{0.02}Nd_{0.04}O_{1.97}$
CZY①: $Ce_{0.55}Zr_{0.38}Y_{0.07}O_{1.97}$
CZY②: $Ce_{0.5}Zr_{0.45}Y_{0.05}O_{1.98}$
CZY③: $Ce_{0.60}Zr_{0.32}Y_{0.08}O_{1.96}$
CZ: $Ce_{0.8}Zr_{0.2}O_2$
Z: $ZrO_2$

[Evaluation of Table 3]

As appreciated from Table 3, the catalytic converter according to each of Examples 8~11 exhibited higher CO—$NO_x$ cross point removal ratio, higher HC removal ratio and lower HC50% removal temperature than the catalytic converter according to each of Comparisons 3 and 4. Further, comparing Examples 8~11 with Examples 5~6 (Table 2), it is observed that the multi-layer catalytic coating is superior than the mono-layer catalytic coating particularly with respect to HC removal ratio.

EXAMPLE 12

In Example 12, a catalytic converter was fabricated by substituting the first coating layer for the second coating layer and vice versa in Example 8. Then, the obtained catalytic converter was subjected to 1,150° C.-aging (as specified below with reference to FIG. 3) and thereafter evaluated for its catalytic performance by determining CO—$NO_x$ cross point removal ratio, HC removal ratio and HC50% removal temperature substantially in the same manner as in Example 1. The results of the performance evaluation are shown in Table 4 below.

(1,150° C. Aging)

The catalytic converter in Example 12 was subjected to 1,150° C. aging wherein the catalytic converter was mounted on one bank (4 cylinders) of a 4-liter V8-engine which was actually installed on a car, and the engine exhaust gas was introduced into the converter. Specifically, the cycle illustrated in FIG. 3 (showing two successive cycles) and continuing for 30 seconds was repeated 6,000 times for a total period of 50 hours.

Figure 3:
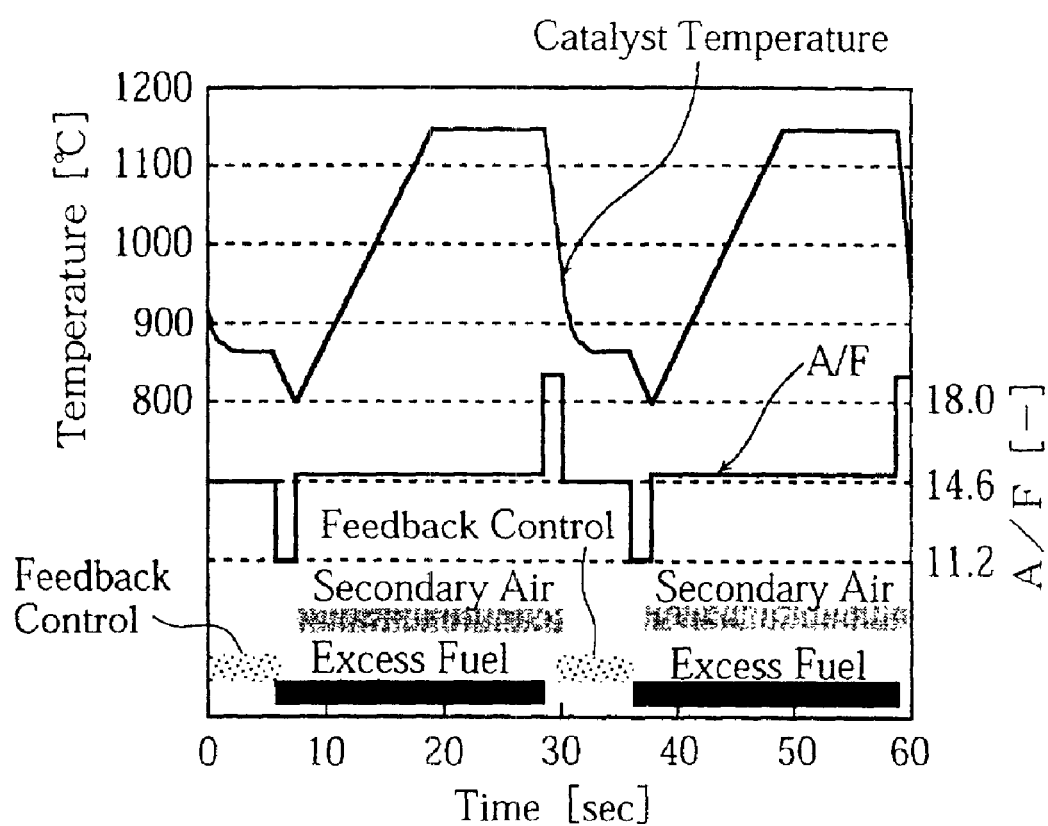
FIG. 3 is a graph showing still another high-temperature aging cycle used for evaluating different catalytic converters.

As shown in FIG. 3, the cycle included a stoichiometric running period (0~5 sec.) wherein the engine is set to run with the feed of stoichiometric air-fuel mixture (A/F=14.6) under feedback control so that the inside temperature of the converter was held at about 850° C. The stoichiometric running period was followed by a fuel-rich period (5~7 sec.) wherein the engine was set to run with the feed of excessive fuel (A/F=11.2) under interruption of the feedback control. The fuel-rich period was then followed by a temperature-rise period (7~28 sec.) wherein the engine continued to run with the feed of excessive fuel under continued interruption of the feedback control but wherein secondary air was introduced from outside the engine into the catalytic converter for reacting the excess fuel with the secondary air within the converter, thereby causing the temperature to rise to a maximum of 1,150° C. The air-fuel mixture supplied to the combination of the engine and the catalytic converter in this temperature-rise period was slightly fuel-lean (A/F=14.8). The temperature-rise period is followed by a lean-running period (28~30 sec.) wherein the feedback control resumes with respect to the engine with the converter held in the fuel-lean state under continued supply of the secondary air.

It should be noted here that the difference between the FIG. 2 aging and the FIG. 3 aging resided in that more excess fuel was introduced for catalytic reaction with secondary air in the FIG. 3 aging. This is why the maximum temperature reached 1,150° C. in the FIG. 3 aging.

EXAMPLE 13

In Example 13, a catalytic converter was fabricated by substituting the first coating layer for the second coating layer and vice versa in Example 9.

Then, the obtained catalytic converter was subjected to 1,150° C.-aging (FIG. 3) and thereafter evaluated for its catalytic performance by determining CO—$NO_x$ cross point removal ratio, HC removal ratio and HC50% removal temperature substantially in the same manner as in Example 12. The results of the performance evaluation are also shown in Table 4 below.

EXAMPLE 14

In Example 14, a catalytic converter was fabricated by substituting the first coating layer for the second coating layer and vice versa in Example 10.

Then, the obtained catalytic converter was subjected to 1,150° C.-aging (FIG. 3) and thereafter evaluated for its catalytic performance by determining CO—NO$_x$ cross point removal ratio, HC removal ratio and HC50% removal temperature substantially in the same manner as in Example 12. The results of the performance evaluation are also shown in Table 4 below.

EXAMPLE 15

In Example 15, a catalytic converter was fabricated by substituting the first coating layer for the second coating layer and vice versa in Example 11.

Then, the obtained catalytic converter was subjected to 1,150° C.-aging (FIG. 3) and thereafter evaluated for its catalytic performance by determining CO—NO$_x$ cross point removal ratio, HC removal ratio and HC50% removal temperature substantially in the same manner as in Example 12. The results of the performance evaluation are also shown in Table 4 below.

TABLE 4

| | Coating Composition [g/dm$^3$-cat.] | | CO—NO$_x$ Cross Point Removal [%] | HC Removal [%] | HC50% Removal Temp. [° C.] |
|---|---|---|---|---|---|
| | 1st. Layer | 2nd. Layer | | | |
| Ex. 12 | Pt—Rh(0.75–0.6)/ZCL(50)<br>Pt—Rh(0.75–0.6)/CZY①(50)<br>CZY①(30)<br>Al$_2$O$_3$(50) | Pd(1.5)/Al$_2$O$_3$(70)<br>BaSO$_4$(40) | 97.4 | 98.3 | 319 |
| Ex. 13 | Pt—Rh(0.75–0.9)/ZCLN(50)<br>Pt—Rh(0.75–0.3)/CZY②(75)<br>Al$_2$O$_3$(55) | Pd(1.5)/Al$_2$O$_3$(50)<br>CZY①(45)<br>BaSO$_4$(20) | 98.2 | 98.8 | 316 |
| Ex. 14 | Pt—Rh(0.75–1.0)/ZCL(50)<br>Pt—Rh(0.75–0.2)/CZY③(90)<br>Al$_2$O$_3$(80) | Pd(1.5)/CZY③(20)<br>Al$_2$O$_3$(50)<br>BaSO$_4$(20) | 97.4 | 96.2 | 325 |
| Ex. 15 | Pt—Rh(0.75–0.67)/ZCLN(50)<br>Pt—Rh(0.75–0.23)/CZY②(75)<br>Al$_2$O$_3$(55) | Pd(1.5)/Al$_2$O$_3$(50)<br>BaSO$_4$(20)<br>CZY②(20) | 97.1 | 92.7 | 328 |
| Comparison 5 | Pt—Rh(0.75–0.5)/Z(50)<br>Pt—Rh(0.75–0.7)/CZ(75)<br>Al$_2$O$_3$(55) | Pd(1.5)/Al$_2$O$_3$(50)<br>CZ(45) | 79.1 | 84.6 | 371 |
| Comparison 6 | Pt—Rh(0.75–0.5)/Z(55)<br>Pt—Rh(0.75–0.7)/CZ(70)<br>Al$_2$O$_3$(45) | Pd(1.5)/CZ(45)<br>Al$_2$O$_3$(60) | 80.3 | 81.7 | 369 |

ZCL: $Zr_{0.80}Ce_{0.16}La_{0.04}O_{1.98}$
ZCLN: $Zr_{0.78}Ce_{0.16}La_{0.02}Nd_{0.04}O_{1.97}$
CZY①: $Ce_{0.55}Zr_{0.38}Y_{0.07}O_{1.97}$
CZY②: $Ce_{0.5}Zr_{0.45}Y_{0.05}O_{1.98}$
CZY③: $Ce_{0.60}Zr_{0.32}Y_{0.08}O_{1.96}$
CZ: $Ce_{0.8}Zr_{0.2}O_2$
Z: $ZrO_2$

[Evaluation of Table 4]

As appreciated from Table 4, the catalytic converter according to each of Examples 12~15 exhibited higher CO—NO$_x$ cross point removal ratio, higher HC removal ratio and lower HC50% removal temperature than the catalytic converter according to each of Comparisons 5 and 6.

CONCLUSION

In conclusion, therefore, a catalytic converter according to the present invention is capable of maintaining high catalytic activity even after severe aging (i.e., even after long-term high temperature running of the engine) while providing excellent HC removal even at low temperature (i.e., even before the engine is sufficiently warmed up).

What is claimed is:

1. A catalytic converter for cleaning exhaust gas comprising:

a heat-resistant support; and a catalytic coating formed on the heat-resistant support;

wherein the catalytic coating includes a first coating layer formed on the heat-resistant support and a second layer formed on the first layer;

wherein the first coating of the catalytic coating contains zirconium complex oxide on which Pt and Rh are coexistently carried, and cerium complex oxide on which Pt and Rh are coexistently carried;

wherein the second coating of the catalytic coating contains Pd-carrying alumina or Pd-carrying cerium complex oxide;

wherein the zirconium complex oxide is represented by the following general formula:

$$Zr_{1-(a+b)}Ce_aN_bO_{2-c} \quad (1)$$

in the formula (1), N represents an element selected from the group consisting of an alkaline earth metal and a rare earth element other than Ce and Zr, c represents the degree of oxygen deficiency determined by the valence and proportion of the contained element N, $0.65 \leq 1-(a+b) \leq 0.9$, $0.1 \leq a \leq 0.35$, and $0 \leq b \leq 0.2$; and wherein the cerium complex oxide is represented by the following general formula:

$$Ce_{1-(x+y)}Zr_xM_yO_{2-z} \quad (2)$$

in the formula (2), M represents an element selected from the group consisting of an alkaline earth metal and a rare earth element other than Ce and Zr, z represents the degree of oxygen deficiency determined by the valence and proportion of the contained element M, $0.35 \leq 1-(x+y) \leq 0.80$, $0.20 \leq x \leq 0.65$, and $0 \leq y \leq 0.2$.

2. The catalytic converter of claim 1, wherein the amount of Rh carried on the zirconium complex oxide is no less than the amount of Rh carried on the cerium complex oxide.

3. The catalytic converter of claim 1, wherein the ratio of the amount of Rh carried on the zirconium complex oxide to the amount of Rh carried on the cerium complex oxide is 1/1~19/1.

4. The catalytic converter of claim 3, wherein the ratio of the amount of Rh carried on the zirconium complex oxide to the amount of Rh carried on the cerium complex oxide is 1/1~5/1.

5. The catalytic converter of claim 1, wherein the second coating layer also contains barium sulfate.

6. The catalytic converter of claim 1, wherein the heat-resistant support has a honeycomb structure.

* * * * *